United States Patent
Ando et al.

(10) Patent No.: US 12,365,596 B2
(45) Date of Patent: Jul. 22, 2025

(54) SYSTEM FOR AND METHOD OF PROCESSING WASTE LITHIUM-ION BATTERY

(71) Applicant: KAWASAKI JUKOGYO KABUSHIKI KAISHA, Kobe (JP)

(72) Inventors: Fuminori Ando, Kobe (JP); Hiroaki Osawa, Kobe (JP); Shoji Takada, Kobe (JP); Chie Nakajima, Kobe (JP); Mariko Yamashita, Kobe (JP); Masahiro Sugata, Kobe (JP); Koji Fukumoto, Kobe (JP); Masaki Tsuzawa, Kobe (JP); Ryosuke Nagai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 786 days.

(21) Appl. No.: 17/616,096

(22) PCT Filed: Feb. 26, 2020

(86) PCT No.: PCT/JP2020/007573
§ 371 (c)(1),
(2) Date: Dec. 2, 2021

(87) PCT Pub. No.: WO2020/246079
PCT Pub. Date: Dec. 10, 2020

(65) Prior Publication Data
US 2022/0315437 A1    Oct. 6, 2022

(30) Foreign Application Priority Data
Jun. 7, 2019    (JP) .................................. 2019-106818

(51) Int. Cl.
*B09B 3/80*    (2022.01)
*B09B 3/70*    (2022.01)
(Continued)

(52) U.S. Cl.
CPC ................ *C01D 15/08* (2013.01); *B09B 3/70* (2022.01); *B09B 3/80* (2022.01); *C22B 3/06* (2013.01);
(Continued)

(58) Field of Classification Search
CPC .. C01D 15/08; B09B 3/70; B09B 3/80; B09B 2101/16; B09B 3/00; B09B 5/00;
(Continued)

(56) References Cited

U.S. PATENT DOCUMENTS 8,691,169 B2 *   4/2014   Perez ..................... C22B 26/12
                                                      423/166
2008/0050295 A1  2/2008   Uchida et al.
(Continued)

FOREIGN PATENT DOCUMENTS

EP    3 663 262 A1    6/2020
JP    2000-119764 A   4/2000
(Continued)

OTHER PUBLICATIONS

Ariyoshi et al. JP2019026916A English Translation (Year: 2019).*
(Continued)

*Primary Examiner* — Lessanework Seifu
(74) *Attorney, Agent, or Firm* — Oliff PLC (57) ABSTRACT

A system for processing a waste lithium-ion battery includes: a first aqueous solution generator that includes a first elution tank storing water, and that immerses an active material taken out from the waste lithium-ion battery in the water in the first elution tank and subjects the active material to carbon dioxide bubbling in the first elution tank to generate an aqueous solution of pH 5.5 to 8.5, in which lithium contained in the active material is eluted; a first solid-liquid separator that removes a solid component from the aqueous solution generated by the first aqueous solution (Continued)

generator; a first crystallizer that causes lithium carbonate to be deposited from the aqueous solution, from which the solid component has been removed by the first solid-liquid separator; and a second solid-liquid separator that performs solid-liquid separation on slurry containing the lithium carbonate deposited in the first crystallizer to take out the lithium carbonate.

4 Claims, 2 Drawing Sheets

(51) Int. Cl.
| | | |
|---|---|---|
| *C01D 15/08* | (2006.01) | |
| *C22B 3/06* | (2006.01) | |
| *C22B 3/22* | (2006.01) | |
| *C22B 3/44* | (2006.01) | |
| *C22B 26/12* | (2006.01) | |
| *H01M 10/54* | (2006.01) | |
| *B09B 101/16* | (2022.01) | |

(52) U.S. Cl.
CPC .................. *C22B 3/22* (2013.01); *C22B 3/44* (2013.01); *C22B 26/12* (2013.01); *H01M 10/54* (2013.01); *B09B 2101/16* (2022.01)

(58) Field of Classification Search
CPC .... C22B 3/06; C22B 3/22; C22B 3/44; C22B 26/12; C22B 7/005; C22B 7/006; H01M 10/54; Y02W 30/84
See application file for complete search history.

(56) References Cited

U.S. PATENT DOCUMENTS

| | | |
|---|---|---|
| 2019/0207275 A1 | 7/2019 | Amouzegar et al. |
| 2021/0108286 A1 | 4/2021 | Arakawa et al. |

FOREIGN PATENT DOCUMENTS

| | | | | |
|---|---|---|---|---|
| JP | 2006-004883 A | | 1/2006 | |
| JP | 2018-172732 A | | 11/2018 | |
| JP | 2019026916 A | * | 2/2019 | ............... B09B 3/00 |
| WO | 2015/155684 A2 | | 10/2015 | |
| WO | 2017/197528 A1 | | 11/2017 | |
| WO | 2019/026978 A1 | | 2/2019 | |

OTHER PUBLICATIONS

Zhao et al., "Research Progress of Lithium Carbonate Preparation and Purification Process", The Chinese Journal of Process Engineering, Feb. 2018, vol. 18, No. 1.

\* cited by examiner

SYSTEM FOR AND METHOD OF PROCESSING WASTE LITHIUM-ION BATTERY

CROSS-REFERENCE TO RELATED APPLICATION

This application is a national stage application of International Application No. PCT/JP2020/007573, filed Feb. 26, 2020 which designates the United States, claims the benefit of Japanese Patent Application No. 2019-106818, filed on Jun. 7 2019, the entire disclosure of which is incorporated by reference herein.

TECHNICAL FIELD

The present invention relates to a system for and a method of processing a waste lithium-ion battery.

BACKGROUND ART

Lithium-ion batteries (LIB) are widely used in electric automobiles, mobile phones, laptop computers, etc. A lithium-ion battery includes, for example, a cathode material, an anode material, an electrolyte solution, and a separator. The cathode material is formed in such a manner that a cathode active material, such as lithium cobalt oxide, lithium nickel oxide, or lithium manganese oxide, is fixed to an aluminum foil by a fluorine-based binder. The anode material is formed in such a manner that an anode active material, such as graphite, is fixed to a copper foil by a fluorine-based binder.

In order to recover useful metals such as cobalt, nickel, manganese, and lithium from lithium-ion batteries to be discarded (waste lithium-ion batteries), such as spent lithium-ion batteries, heat treatment (roasting) is performed thereon for the purpose of detoxifying (decomposing and removing) the electrolyte solution and reducing the volume of combustibles, such as the separator and the binder.

Patent Literature 1 discloses: bringing the roasted waste lithium-ion batteries (lithium-ion battery scrap) into contact with water to obtain a lithium-dissolved solution; subjecting the lithium-dissolved solution to solvent extraction and back extraction to obtain a lithium concentrate; and obtaining lithium carbonate from the lithium concentrate.

CITATION LIST

Patent Literature

PTL 1: Japanese Laid-Open Patent Application Publication No. 2018-172732

SUMMARY OF INVENTION

Technical Problem

However, the roasted waste lithium-ion batteries contain not only lithium oxide, which is a readily-soluble compound, but also lithium carbonate, lithium phosphate, and lithium fluoride, which are poorly-soluble compounds. With the above technique disclosed in Patent Literature 1, lithium cannot be recovered from the poorly-soluble lithium compounds.

The present invention has been made to solve the above-described problems, and an object of the present invention is to provide a system for and a method of processing a waste lithium-ion battery, the system and the method making it possible to improve the recovery rate of lithium.

Solution to Problem

In order to achieve the above object, a system for processing a waste lithium-ion battery according to one aspect of the present invention includes: a first aqueous solution generator that includes a first elution tank storing water, and that immerses an active material taken out from the waste lithium-ion battery in the water in the first elution tank and subjects the active material to carbon dioxide bubbling in the first elution tank to generate an aqueous solution of pH 5.5 to 8.5, in which lithium contained in the active material is eluted; a first solid-liquid separator that removes a solid component from the aqueous solution generated by the first aqueous solution generator; a first crystallizer that causes lithium carbonate to be deposited from the aqueous solution, from which the solid component has been removed by the first solid-liquid separator; and a second solid-liquid separator that performs solid-liquid separation on slurry containing the lithium carbonate deposited in the first crystallizer to take out the lithium carbonate.

According to this configuration, in the first aqueous solution generator, the active material taken out from the waste lithium-ion battery is immersed in the water stored in the first elution tank, subjected to carbon dioxide bubbling in the first elution tank, and thereby an aqueous solution in which lithium is eluted is generated. In the aqueous solution, poorly-soluble lithium carbonate turns into readily-soluble lithium hydrogen carbonate, which is dissolved in the aqueous solution. Also, readily-soluble lithium oxide reacts with carbon dioxide to turn into readily-soluble lithium hydrogen carbonate while temporarily turning into lithium carbonate, and the readily-soluble lithium hydrogen carbonate is dissolved in the aqueous solution. Accordingly, the lithium concentration in the aqueous solution is increased, and the amount of lithium carbonate deposited in the first crystallizer is increased, which makes it possible to improve the recovery rate of lithium recovered as lithium carbonate. Moreover, by performing the carbon dioxide bubbling, the pH of the aqueous solution can be kept neutral or kept at a value close to neutral (5.5 to 8.5), which makes it possible to suppress the elution of aluminum into the aqueous solution and remove solid components including aluminum from the aqueous solution by the first solid-liquid separator. Consequently, the purity of the lithium carbonate taken out by the second solid-liquid separator can be increased.

The system may further include: a second aqueous solution generator that generates an aqueous solution of lithium carbonate by introducing the lithium carbonate taken out by the second solid-liquid separator into a second elution tank; a third solid-liquid separator that removes a solid component from the aqueous solution generated by the second aqueous solution generator; a second crystallizer that causes lithium carbonate to be deposited from the aqueous solution, from which the solid component has been removed by the third solid-liquid separator; and a fourth solid-liquid separator that performs solid-liquid separation on slurry containing the lithium carbonate deposited in the second crystallizer to take out the lithium carbonate.

According to this configuration, lithium carbonate can be taken out by the fourth solid-liquid separator with a higher purity than the purity of the lithium carbonate taken out by the second solid-liquid separator.

The second aqueous solution generator may generate the aqueous solution of lithium carbonate without performing carbon dioxide bubbling.

The system may further include: a filtrate feeding passage that feeds filtrates from which lithium carbonate has been taken out by the second and fourth solid-liquid separators, respectively, to one of or both the first and second elution tanks; and a cooler that cools the filtrates, the cooler being positioned at a non-end portion of the filtrate feeding passage.

According to this configuration, the recovery rate of lithium recovered as lithium carbonate can be further improved.

The system may further include a remover that removes phosphorus and/or fluorine from the filtrates, the remover being positioned at a non-end portion of the filtrate feeding passage.

In a case where the active material taken out from the waste lithium-ion battery contains phosphorus and/or fluorine as an impurity or impurities, the filtrates may contain the phosphorus and/or the fluorine. According to the above configuration, the phosphorus is removed from the filtrates. This makes it possible to prevent, in the elution tanks to which the filtrates are fed, the production of poorly-soluble lithium phosphate due to the reaction of lithium ions with phosphoric acid. According to the above configuration, the fluorine is also removed from the filtrates. This makes it possible to prevent, in the elution tanks to which the filtrates are fed, the production of poorly-soluble lithium fluoride due to the reaction of lithium ions with fluorine.

The first solid-liquid separator may include: an upper layer solid-liquid separator that takes out an upper layer portion of the aqueous solution from the first elution tank to remove a floating solid component from the aqueous solution; and a lower layer solid-liquid separator that takes out a lower layer portion of the aqueous solution from the first elution tank to remove a settling solid component from the aqueous solution.

According to this configuration, solid components contained in the aqueous solution can be removed (recovered) from the aqueous solution as a floating solid component and a settling solid component separately.

The system may further include: a return passage that returns a filtrate from which lithium carbonate has been taken out by the second solid-liquid separator to the first elution tank; and a remover that removes phosphorus and/or fluorine from the filtrate, the remover being positioned at a non-end portion of the return passage.

According to this configuration, by returning the filtrate from which the lithium carbonate has been taken out to the first elution tank, the recovery rate of lithium can be further improved. In a case where the active material taken out from the waste lithium-ion battery contains phosphorus and/or fluorine as an impurity or impurities, the filtrate may contain the phosphorus and/or the fluorine. According to the above configuration, the phosphorus is removed from the filtrate. This makes it possible to prevent, in the first elution tank, the production of poorly-soluble lithium phosphate due to the reaction of lithium ions with phosphoric acid. According to the above configuration, the fluorine is also removed from the filtrate. This makes it possible to prevent, in the first elution tank, the production of poorly-soluble lithium fluoride due to the reaction of lithium ions with fluorine.

The remover may remove the phosphorus and/or the fluorine from the filtrate by bringing at least one of calcium oxide or calcium carbonate into contact with the filtrate.

According to this configuration, the remover can be configured by using calcium oxide and/or calcium carbonate, which are relatively inexpensive.

A method of processing a waste lithium-ion battery according to one aspect of the present invention includes: a first aqueous solution generating step of immersing an active material taken out from the waste lithium-ion battery in water stored in a first elution tank and subjecting the active material to carbon dioxide bubbling in the first elution tank to generate an aqueous solution of pH 5.5 to 8.5, in which lithium contained in the active material is eluted; a first solid-liquid separating step of removing a solid component from the aqueous solution generated in the first aqueous solution generating step; a first crystallizing step of causing lithium carbonate to be deposited from the aqueous solution, from which the solid component has been removed in the first solid-liquid separating step; and a second solid-liquid separating step of performing solid-liquid separation on slurry containing the lithium carbonate deposited in the first crystallizing step to take out the lithium carbonate.

According to this method, in the first aqueous solution generating step, the active material taken out from the waste lithium-ion battery is immersed in the water stored in the first elution tank, subjected to carbon dioxide bubbling in the first elution tank, and thereby an aqueous solution in which lithium is eluted is generated. In the aqueous solution, poorly-soluble lithium carbonate turns into readily-soluble lithium hydrogen carbonate, which is dissolved in the aqueous solution. Also, readily-soluble lithium oxide reacts with carbon dioxide to turn into readily-soluble lithium hydrogen carbonate while temporarily turning into lithium carbonate, and the readily-soluble lithium hydrogen carbonate is dissolved in the aqueous solution. Accordingly, the lithium concentration in the aqueous solution is increased, and the amount of lithium carbonate deposited in the first crystallizing step is increased, which makes it possible to improve the recovery rate of lithium recovered as lithium carbonate. Moreover, by performing the carbon dioxide bubbling, the pH of the aqueous solution can be kept neutral or kept at a value close to neutral (5.5 to 8.5), which makes it possible to suppress the elution of aluminum into the aqueous solution and remove solid components including aluminum from the aqueous solution in the first solid-liquid separating step. Consequently, the purity of the lithium carbonate taken out in the second solid-liquid separating step can be increased.

The method may further include: a second aqueous solution generating step of generating an aqueous solution of lithium carbonate by introducing the lithium carbonate taken out in the second solid-liquid separating step into a second elution tank; a third solid-liquid separating step of removing a solid component from the aqueous solution generated in the second aqueous solution generating step; a second crystallizing step of causing lithium carbonate to be deposited from the aqueous solution, from which the solid component has been removed in the third solid-liquid separating step; and a fourth solid-liquid separating step of performing solid-liquid separation on slurry containing the lithium carbonate deposited in the second crystallizing step to take out the lithium carbonate.

According to this method, lithium carbonate can be taken out in the fourth solid-liquid separating step with a higher purity than the purity of the lithium carbonate taken out in the second solid-liquid separating step.

The second aqueous solution generating step may include generating the aqueous solution of lithium carbonate without performing carbon dioxide bubbling.

The method may further include: a filtrate feeding step of feeding filtrates from which lithium carbonate has been taken out in the second and fourth solid-liquid separating steps, respectively, to one of or both the first and second elution tanks; and a cooling step of cooling the filtrates, the cooling step being performed during the filtrate feeding step.

According to this method, the recovery rate of lithium recovered as lithium carbonate can be further improved.

The method may further include a removing step of removing phosphorus and/or fluorine from the filtrates, the removing step being performed during the filtrate feeding step.

In a case where the active material taken out from the waste lithium-ion battery contains phosphorus and/or fluorine as an impurity or impurities, the filtrates may contain the phosphorus and/or the fluorine. According to the above method, the phosphorus is removed from the filtrates. This makes it possible to prevent, in the elution tanks to which the filtrates are fed, the production of poorly-soluble lithium phosphate due to the reaction of lithium ions with phosphoric acid. According to the above method, the fluorine is also removed from the filtrates. This makes it possible to prevent, in the elution tanks to which the filtrates are fed, the production of poorly-soluble lithium fluoride due to the reaction of lithium ions with fluorine.

The first solid-liquid separating step may include: an upper layer solid-liquid separating step of taking out an upper layer portion of the aqueous solution from the first elution tank to remove a floating solid component from the aqueous solution; and a lower layer solid-liquid separating step of taking out a lower layer portion of the aqueous solution from the first elution tank to remove a settling solid component from the aqueous solution.

According to this method, solid components contained in the aqueous solution can be removed (recovered) from the aqueous solution as a floating solid component and a settling solid component separately.

The method may further include: a returning step of returning a filtrate from which lithium carbonate has been taken out in the second solid-liquid separating step to the first elution tank; and a removing step of removing phosphorus and/or fluorine from the filtrate, the removing step being performed during the returning step.

According to this method, by returning the filtrate from which the lithium carbonate has been taken out to the first elution tank, the recovery rate of lithium can be further improved. In a case where the active material taken out from the waste lithium-ion battery contains phosphorus and/or fluorine as an impurity or impurities, the filtrate may contain the phosphorus and/or the fluorine. According to the above method, the phosphorus is removed from the filtrate. This makes it possible to prevent, in the first elution tank, the production of poorly-soluble lithium phosphate due to the reaction of lithium ions with phosphoric acid. According to the above method, the fluorine is also removed from the filtrate. This makes it possible to prevent, in the first elution tank, the production of poorly-soluble lithium fluoride due to the reaction of lithium ions with fluorine.

The removing step may include removing the phosphorus and/or the fluorine from the filtrate by bringing at least one of calcium oxide or calcium carbonate into contact with the filtrate.

According to this method, the removing step can be performed by using calcium oxide and/or calcium carbonate, which are relatively inexpensive.

Advantageous Effects of Invention

The present invention is configured as described above, and has an advantage of being able to provide a system for and a method of processing a waste lithium-ion battery, the system and the method making it possible to improve the recovery rate of lithium.

The above and other objects, features, and advantages of the present invention will more fully be apparent from the following detailed description of preferred embodiments with reference to the accompanying drawings.

DESCRIPTION OF EMBODIMENTS

Hereinafter, preferred embodiments of the present invention are described with reference to the drawings. The present invention is not limited to the embodiments described below. Embodiments 1 and 2 below describe an example case where waste lithium-ion batteries are NCM batteries. However, the waste lithium-ion batteries are not limited to NCM batteries. A NCM battery is a battery whose cathode active material contains lithium, nickel, cobalt, and manganese and whose anode active material contains graphite. In the NCM battery, an aluminum foil is used as a cathode current collector, and a copper foil is used as an anode current collector.

Embodiment 1

Figure 1:
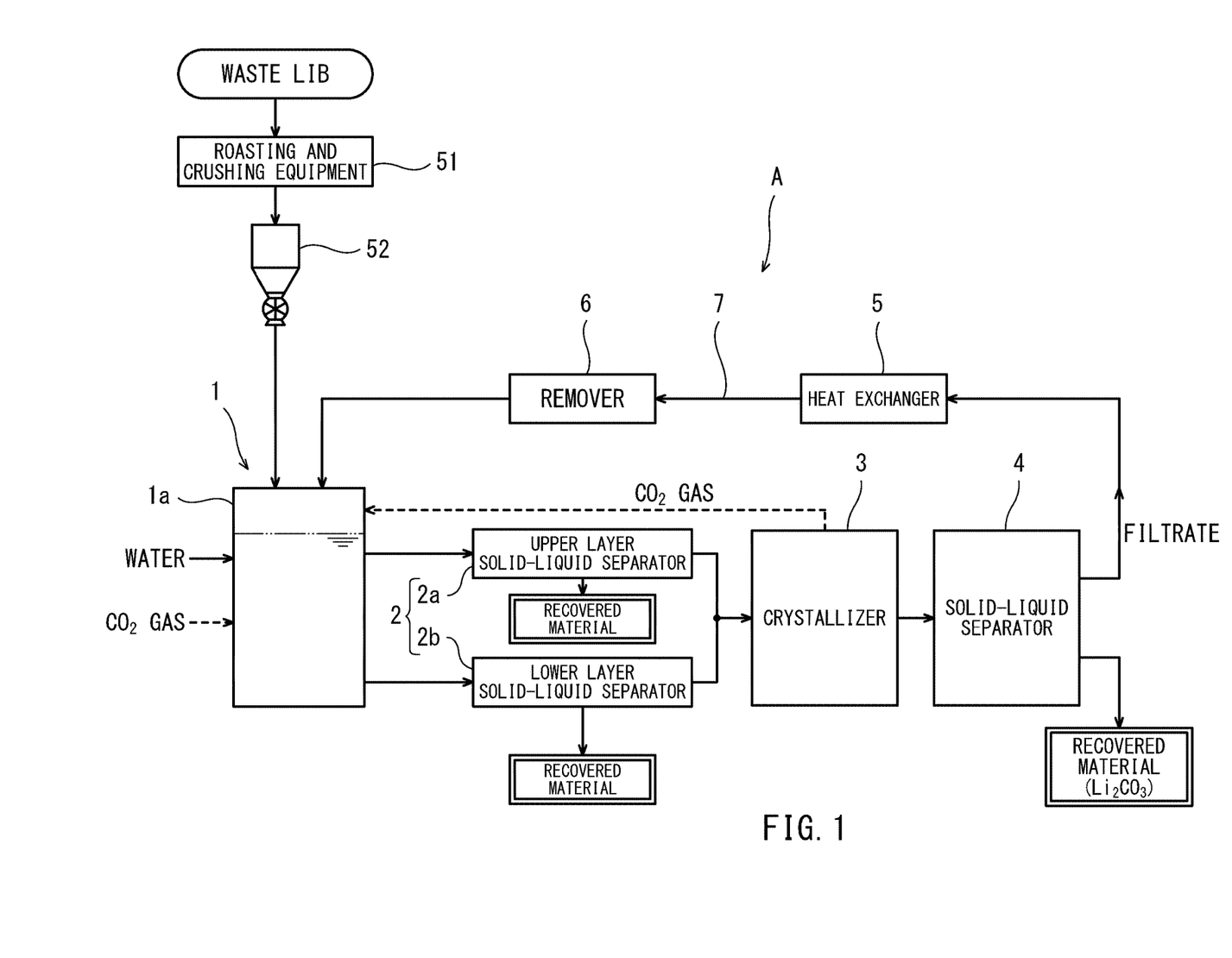
FIG. 1 is a schematic diagram schematically showing a system for processing a waste lithium-ion battery according to one example of Embodiment 1.

FIG. 1 is a schematic diagram schematically showing a system for processing waste lithium-ion batteries (hereinafter, "waste lithium-ion battery processing system") according to one example of Embodiment 1.

The waste lithium-ion battery processing system A includes an aqueous solution generator 1, a solid-liquid separator 2, a crystallizer 3, a solid-liquid separator 4, and a return passage 7 provided with a heat exchanger 5 and a remover 6, the heat exchanger 5 and the remover 6 each being positioned at a non-end portion of the return passage 7. In this example, the solid-liquid separator 2 includes an upper layer solid-liquid separator 2a and a lower layer solid-liquid separator 2b. Alternatively, the solid-liquid separator 2 may be a single solid-liquid separator.

Materials to be processed by the processing system A are waste lithium-ion battery active materials that are obtained as a result of waste lithium-ion batteries being subjected to, for example, a roasting process, a crushing process, and a classifying process by roasting and crushing equipment 51. The waste lithium-ion batteries (waste LIB) to be processed by the roasting and crushing equipment 51 may be individual battery cells, or may be battery modules in each of which battery cells are combined, or may be battery units in each of which battery modules are combined.

A waste lithium-ion battery includes, for example, an exterior material serving as a battery case, a cathode material, an anode material, an electrolyte solution, and a separator. The cathode material is formed in such a manner that a cathode active material is fixed to a cathode current collector (e.g., an aluminum foil) by a binder. A lithium-containing oxide (e.g., an oxide that contains lithium, nickel, manganese, and cobalt) is used as the cathode active material. The anode material is formed in such a manner that an anode active material, such as graphite, is fixed to an anode current collector (e.g., a copper foil) by a binder. A fluorine-containing resin, such as PTFE or PVDF, is used as the binder. Lithium hexafluorophosphate (LiPF$_6$) is used as the electrolyte of the electrolyte solution.

For example, the roasting and crushing equipment 51 may: roast (heat-treat at 400° C. or higher) the waste lithium-ion batteries; then crush the roasted batteries; and thereafter perform a classifying process of sorting out the active materials from the crushed batteries. Alternatively, the roasting and crushing equipment 51 may: heat-treat the waste lithium-ion batteries at a temperature lower than 400° C. to detoxify the electrolyte solution; then crush the heat-treated batteries; thereafter roast (heat-treat at 400° C. or higher) the crushed batteries; and subsequently perform a classifying process of sorting out the active materials from the roasted batteries. Further alternatively, the roasting and crushing equipment 51 may: heat-treat the waste lithium-ion batteries at a temperature lower than 400° C. to detoxify the electrolyte solution; then crush the heat-treated batteries; thereafter perform a classifying process of sorting out the active materials from the crushed batteries; and subsequently roast (heat-treat at 400° C. or higher) the active materials that have been sorted out. Thus, the roasting and crushing equipment 51 can be modified in various ways. Part of these processes may be performed manually. For example, the crushing process may be a process in which the batteries are manually disassembled.

The waste lithium-ion battery active materials obtained by the roasting and crushing equipment 51, which are the material to be processed by the processing system A, are, for example, fed in predetermined amounts to an elution tank 1*a* of the aqueous solution generator 1 via a hopper 52.

In the description herein, the materials to be processed by the processing system A (hereinafter, also simply referred to as "the to-be-processed materials") are, for example, the waste lithium-ion battery active materials (the cathode and anode active materials) that have been sorted out in the classifying process by the roasting and crushing equipment 51. However, with the roasting and crushing equipment 51, it is difficult to exactly sort out only the active materials. The to-be-processed materials contain not only the active materials, but also other elements, for example, impurities such as fluorine contained in the binder or the like, phosphorus contained in the electrolyte solution, and aluminum contained in the cathode current collector.

The aqueous solution generator 1 includes the elution tank 1*a*, a carbon dioxide bubbling mechanism, and an agitating mechanism. The aqueous solution generator 1 immerses the to-be-processed materials in normal-temperature water (e.g., about 20° C. to 30° C.) stored in the elution tank 1*a*, and subjects the to-be-processed materials to carbon dioxide bubbling in the elution tank 1*a* (i.e., injects carbon dioxide into the water in which the to-be-processed materials are immersed) while agitating them to generate an aqueous solution of pH 5.5 to 8.5, in which lithium contained in the to-be-processed materials is eluted (first aqueous solution generating step). As a result of the carbon dioxide bubbling, as expressed in a reaction formula shown below, poorly-soluble lithium carbonate turns into readily-soluble lithium hydrogen carbonate, which is dissolved in the aqueous solution.

$$Li_2CO_3 + H_2O \rightarrow 2LiHCO_3$$

As expressed in a reaction formula below, although readily-soluble lithium oxide turns into poorly-soluble lithium carbonate, the resulting lithium carbonate further reacts with carbon dioxide to turn into readily-soluble lithium hydrogen carbonate, which is dissolved in the aqueous solution.

$$Li_2O + CO_2 \rightarrow Li_2CO_3$$

As a result of the carbon dioxide bubbling, the pH (hydrogen ion index) of the aqueous solution can be kept neutral or kept at a value close to neutral (5.5 to 8.5). If the carbon dioxide bubbling is not performed, lithium oxide and so forth are dissolved in the aqueous solution, and thereby the pH of the aqueous solution becomes alkaline. In this case, aluminum is readily eluted into the aqueous solution. By performing the carbon dioxide bubbling to keep the pH of the aqueous solution neutral or at a value close to neutral as in the present embodiment, the elution of aluminum into the aqueous solution can be suppressed, and as described below, solid components including aluminum can be removed from the aqueous solution by the solid-liquid separator 2.

Next, the solid-liquid separator 2 removes solid components, such as nickel, cobalt, manganese, aluminum, and graphite, from the aqueous solution generated by the aqueous solution generator 1 (first solid-liquid separating step), and feeds the removed solid components to the crystallizer 3. More specifically, an upper layer portion of the aqueous solution is taken out from the elution tank 1*a*, for example, by overflow, and is passed through the upper layer solid-liquid separator 2*a* (e.g., a filter) to remove the solid components from the upper layer portion of the aqueous solution, which is then fed to the crystallizer 3. Also, a lower layer portion of the aqueous solution is taken out from the elution tank 1*a*, for example, by a pump (not shown), and is passed through the lower layer solid-liquid separator 2*b* (e.g., a filter) to remove the solid components from the lower layer portion of the aqueous solution, which is then fed to the crystallizer 3.

A single solid-liquid separator may be used instead of the two solid-liquid separators 2*a* and 2*b*. However, by using the two solid-liquid separators 2*a* and 2*b* as described above, floating solid components and settling solid components can be readily separated from each other.

Next, in the crystallizer 3, the aqueous solution is heated, for example, to a temperature of 80° C. or higher (e.g., 85° C.) by a heater. As a result, lithium hydrogen carbonate is deposited as lithium carbonate as expressed in a reaction formula shown below.

$$2LiHCO_3 \rightarrow Li_2CO_3 + CO_2 + H_2O$$

Then, slurry containing the lithium carbonate is fed from the crystallizer 3 to the solid-liquid separator 4. The solid-liquid separator 4 takes out the lithium carbonate, as a recovered material, from the slurry by solid-liquid separation, and feeds a resulting filtrate to the return passage 7. Carbon dioxide (CO$_2$) produced in the crystallizer 3 may be utilized by the aqueous solution generator 1.

The return passage 7 is a passage that returns the filtrate, from which the lithium carbonate has been taken out by the solid-liquid separator 4, to the elution tank 1*a* of the aqueous solution generator 1. The return passage 7 is provided with the heat exchanger 5 and the remover 6. The heat exchanger 5 cools the filtrate having a high-temperature of 80° C. or higher to a normal temperature. The remover 6 removes phosphorus and/or fluorine from the filtrate. By cooling the filtrate that is to return to the elution tank 1*a* to a normal temperature by the heat exchanger 5, a situation in which the temperature of the water in the elution tank 1*a* becomes high and thereby lithium ions are not readily eluted into the water can be avoided.

The remover 6 includes, for example, a tank filled with calcium oxide and/or calcium carbonate. By passing the filtrate through the inside of the tank, the filtrate comes into contact and reacts with the calcium oxide and/or the calcium carbonate, and as a result, phosphorus and/or fluorine is/are removed from the filtrate. In a case where the filtrate contains phosphorus, the phosphorus is present in the form of phosphoric acid. The phosphoric acid reacts with the calcium oxide and/or the calcium carbonate filling the tank, thereby turning into calcium phosphate, which is removed from the filtrate. In this manner, phosphorus (phosphoric acid) is removed from the filtrate that is to return to the elution tank 1a. This makes it possible to prevent, in the elution tank 1a, the production of poorly-soluble lithium phosphate due to the reaction of lithium ions with phosphoric acid.

In a case where the filtrate contains fluorine, the fluorine reacts with the calcium oxide and/or the calcium carbonate filling the tank, thereby turning into calcium fluoride, which is removed from the filtrate. In this manner, fluorine is removed from the filtrate that is to return to the elution tank 1a. This makes it possible to prevent, in the elution tank 1a, the production of poorly-soluble lithium fluoride due to the reaction of lithium ions with fluorine.

As described above, each of the calcium oxide and the calcium carbonate reacts with the phosphoric acid contained in the filtrate, and thereby calcium phosphate is produced. Also, each of the calcium oxide and the calcium carbonate reacts with the fluorine contained in the filtrate, and thereby calcium fluoride is produced. Therefore, the remover 6 may include two tanks, one of which is filled with calcium oxide, and the other filled with calcium carbonate. Alternatively, the remover 6 may include only one of these tanks. Further alternatively, the remover 6 may include one tank that is filled with both calcium oxide and calcium carbonate. Since calcium oxide and calcium carbonate are less expensive than, for example, ion-exchange resin, the remover 6 can be configured at low cost. In this example, on the return passage 7, the remover 6 is positioned downstream of the heat exchanger 5. Alternatively, the remover 6 may be positioned upstream of the heat exchanger 5.

A method of processing a waste lithium-ion battery by the processing system A shown in FIG. 1 includes: a first aqueous solution generating step by the aqueous solution generator 1 (first aqueous solution generator); a first solid-liquid separating step by the solid-liquid separator 2 (first solid-liquid separator); a first crystallizing step by the crystallizer 3 (first crystallizer); a second solid-liquid separating step by the solid-liquid separator 4 (second solid-liquid separator); a returning step of returning a filtrate from which lithium carbonate has been taken out by the solid-liquid separator 4 to the elution tank 1a by the return passage 7; a cooling step by the heat exchanger 5 (cooler), which is positioned at a non-end portion of the return passage 7; and a removing step by the remover 6.

Although the inclusion of the return passage 7 as in the present embodiment makes it possible to further improve the recovery rate of lithium, the return passage 7 can be eliminated.

In the present embodiment, in the aqueous solution generator 1, waste lithium-ion batteries are immersed in the water stored in the elution tank and subjected to carbon dioxide bubbling in the elution tank, and thereby an aqueous solution in which lithium is eluted is generated. As a result, poorly-soluble lithium carbonate turns into readily-soluble lithium hydrogen carbonate, which is dissolved in the aqueous solution. Also, readily-soluble lithium oxide reacts with carbon dioxide to turn into readily-soluble lithium hydrogen carbonate while temporarily turning into lithium carbonate, and the readily-soluble lithium hydrogen carbonate is dissolved in the aqueous solution. Accordingly, the lithium concentration in the aqueous solution is increased, and the amount of lithium carbonate deposited in the crystallizer 3 is increased, which makes it possible to improve the recovery rate of lithium recovered as lithium carbonate. Moreover, by performing the carbon dioxide bubbling, the pH of the aqueous solution can be kept neutral or kept at a value close to neutral (5.5 to 8.5), which makes it possible to suppress the elution of aluminum into the aqueous solution and remove the solid components including aluminum from the aqueous solution by the solid-liquid separator 2. Consequently, the purity of the lithium carbonate recovered by the solid-liquid separator 4 can be increased. The pH value of the aqueous solution when the carbon dioxide bubbling is performed is preferably within the range of 6.5 to 8.0.

Embodiment 2

Figure 2:
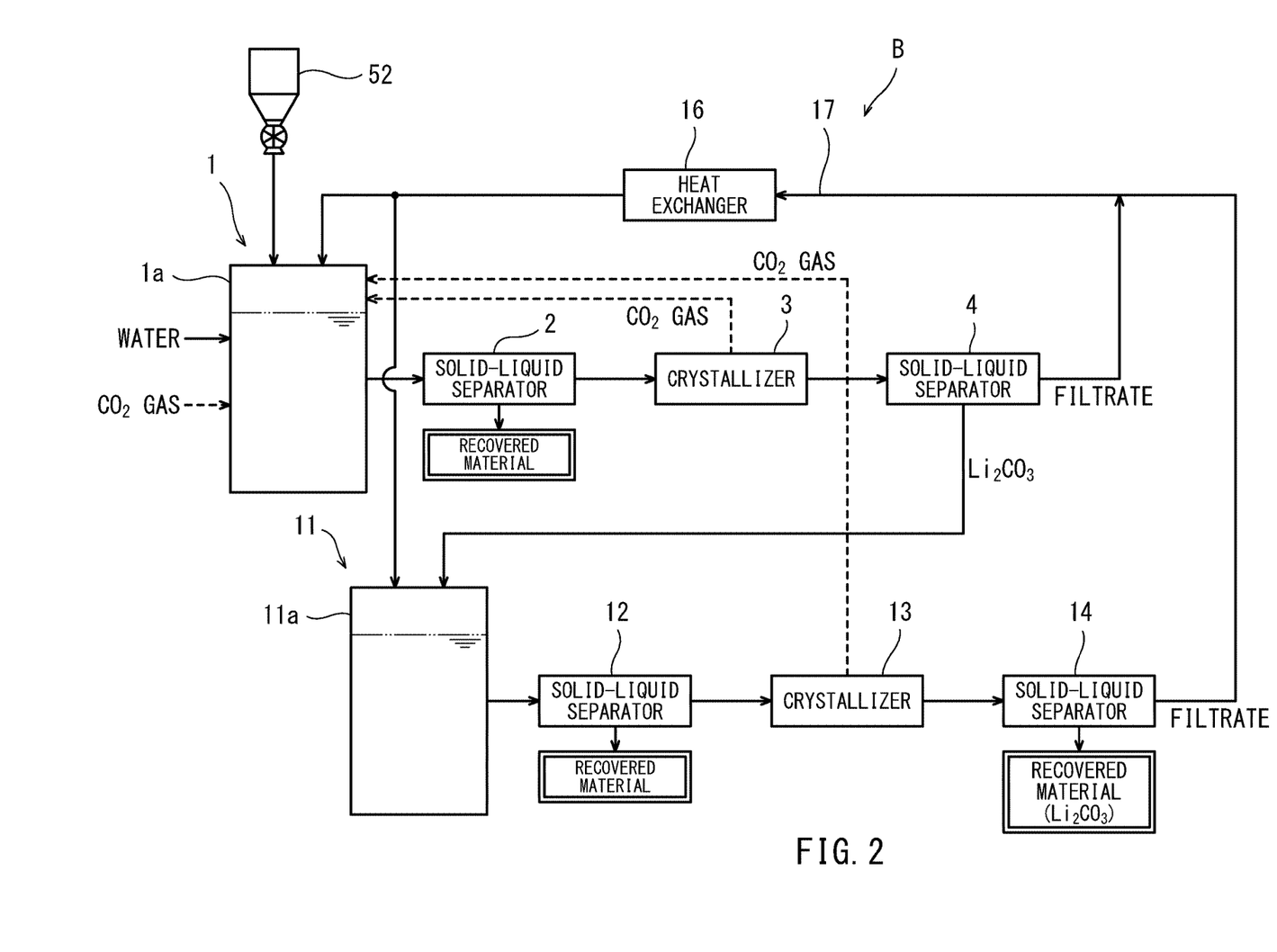
FIG. 2 is a schematic diagram schematically showing a system for processing a waste lithium-ion battery according to one example of Embodiment 2.

FIG. 2 is a schematic diagram schematically showing a system for processing a waste lithium-ion battery (hereinafter, "waste lithium-ion battery processing system") according to one example of Embodiment 2.

The waste lithium-ion battery processing system B includes an aqueous solution generator 1 (first aqueous solution generator), a solid-liquid separator 2 (first solid-liquid separator), a crystallizer 3 (first crystallizer), a solid-liquid separator 4 (second solid-liquid separator), an aqueous solution generator 11 (second aqueous solution generator), a solid-liquid separator 12 (third solid-liquid separator), a crystallizer 13 (second crystallizer), a solid-liquid separator 14 (fourth solid-liquid separator), a heat exchanger 16 (cooler), and a filtrate feeding passage 17.

The aqueous solution generator 1, the solid-liquid separator 2, the crystallizer 3, and the solid-liquid separator 4 of the processing system B correspond to, and may be the same as, the aqueous solution generator 1, the solid-liquid separator 2, the crystallizer 3, and the solid-liquid separator 4 of the above-described processing system A. In this example, unlike the case shown in FIG. 1, the solid-liquid separator 2 of the processing system B is a single solid-liquid separator.

Similar to the aqueous solution generator 1, the aqueous solution generator 11 includes an elution tank 11a and an agitating mechanism (not shown). Similar to the aqueous solution generator 1, the aqueous solution generator 11 may include a carbon dioxide bubbling mechanism. However, in this example, carbon dioxide bubbling is not performed.

In this example, as each of the solid-liquid separators 2, 4, 12, and 14, a filtering device such as a filter press is used.

Also, as each of the crystallizers 3 and 13, for example, a MVR (Mechanical Vapor Recompression) evaporator is used.

The filtrate feeding passage 17 is a passage that feeds filtrates from which lithium carbonate has been taken out by the solid-liquid separators 4 and 14, respectively, to the elution tanks 1a and 11a of the aqueous solution generators 1 and 11. The heat exchanger 16 is positioned at a non-end portion of the filtrate feeding passage 17. The filtrates in the filtrate feeding passage 17 pass through the heat exchanger 16, and are then fed to the elution tanks 1a and 11a.

The heat exchanger 16 is intended for cooling the filtrates, each of which has been heated to a high temperature by the crystallizer 3 or 13, to a normal temperature (e.g., about 20° C. to 30° C.).

Through a test performed by using a testing apparatus, it has been confirmed that even when the filtrate from each of the solid-liquid separators 4 and 14 contains phosphorus and/or fluorine, the amount thereof is so small that it cannot be measured. For this reason, in this example, the remover 6 as shown in FIG. 1 is eliminated. However, as an alternative, the filtrate feeding passage 17 may be provided with the remover 6, which is positioned upstream or downstream of the heat exchanger 16. In this case, the filtrates in the filtrate feeding passage 17 pass through the heat exchanger 16 and the remover 6, and are then fed to the elution tanks 1a and 11a. The filtrates in the filtrate feeding passage 17 may be fed only to the elution tank 1a or only to the elution tank 11a.

Next, processes performed in the processing system B are described. Processing functions exerted by the aqueous solution generator 1, the solid-liquid separator 2, the crystallizer 3, and the solid-liquid separator 4 of the processing system B are the same as the processing functions exerted by the aqueous solution generator 1, the solid-liquid separator 2, the crystallizer 3, and the solid-liquid separator 4 of the processing system A shown in FIG. 1. In the processing system B, the solid-liquid separator 2 is a single solid-liquid separator. As with the case shown in FIG. 1, the solid-liquid separator 2 removes solid components, such as nickel, cobalt, manganese, aluminum, and graphite, as recovered materials. In the crystallizer 3 of the processing system B, for example, MVR technique may be adopted, in which the aqueous solution is heated, and thereby lithium carbonate may be deposited.

Further, in the processing system B, the filtrate from which lithium carbonate has been taken out by the solid-liquid separator 4 is fed to the filtrate feeding passage 17, and cooled by the heat exchanger 16 to a normal temperature, which is then fed to the elution tanks 1a and 11a.

Meanwhile, the lithium carbonate taken out by the solid-liquid separator 4 is fed to the filtrate-storing elution tank 11a, and agitated in the elution tank 11a. In this manner, an aqueous solution of lithium carbonate is generated. The elution tank 11a may be fed with not only the filtrates but also water in order to dissolve all the lithium carbonate in the elution tank 11a.

Next, the aqueous solution generated in the elution tank 11a is fed to the solid-liquid separator 12. The solid-liquid separator 12 removes solid components, such as nickel, as recovered materials from the aqueous solution by solid-liquid separation.

Next, the aqueous solution of lithium carbonate, from which the solid components have been removed by the solid-liquid separator 12, is fed to the crystallizer 13. In the crystallizer 13, for example, MVR technique may be adopted, in which the aqueous solution is heated, and thereby lithium carbonate may be deposited.

Then, slurry containing the lithium carbonate is fed from the crystallizer 13 to the solid-liquid separator 14. The solid-liquid separator 14 takes out the lithium carbonate, as a recovered material, from the slurry by solid-liquid separation, and feeds a resulting filtrate to the filtrate feeding passage 17. The filtrate is, after being cooled by the heat exchanger 16 to a normal temperature, fed to the elution tanks 1a and 11a. Carbon dioxide ($CO_2$) produced in the crystallizer 13 may be utilized by the aqueous solution generator 1.

In the processing system B, as a result of the carbon dioxide bubbling in the aqueous solution generator 1, nickel and so forth in a slight amount turn into carbonates and are dissolved in the aqueous solution. These carbonates dissolved in the aqueous solution, such as nickel carbonate, are fed to the crystallizer 3 without being recovered by the solid-liquid separator 2, and deposited in the crystallizer 3 as carbonates. Therefore, the recovered materials that are subsequently taken out by the solid-liquid separator 4 contain a slight amount of carbonates, such as nickel carbonate, in addition to lithium carbonate. Through an experiment, it has been confirmed that the purity of the lithium carbonate taken out by the solid-liquid separator 4 is about 98 to 99%.

In the present embodiment, the recovered materials taken out by the solid-liquid separator 4 are mixed with the filtrate in the aqueous solution generator 11 and agitated therein. At the time, since carbon dioxide bubbling is not performed, nickel and so forth in a slight amount that are contained as carbonates in the recovered materials are not dissolved, but subsequently removed by the solid-liquid separator 12 as recovered materials. Therefore, the purity of the lithium carbonate that is subsequently deposited in the crystallizer 13 and taken out by the solid-liquid separator 14 as a recovered material can be further increased. Through an experiment, it has been confirmed that the purity of the lithium carbonate taken out by the solid-liquid separator 14 is 99.5% or higher.

As described above, Embodiment 2 not only has the same advantageous effects as those of Embodiment 1, but also makes it possible to further increase the purity of the lithium carbonate recovered at the end.

A method of processing a waste lithium-ion battery by the processing system B shown in FIG. 2 includes: a first aqueous solution generating step by the aqueous solution generator 1 (first aqueous solution generator); a first solid-liquid separating step by the solid-liquid separator 2 (first solid-liquid separator); a first crystallizing step by the crystallizer 3 (first crystallizer); a second solid-liquid separating step by the solid-liquid separator 4 (second solid-liquid separator); a second aqueous solution generating step by the aqueous solution generator 11 (second aqueous solution generator); a third solid-liquid separating step by the solid-liquid separator 12 (third solid-liquid separator); a second crystallizing step by the crystallizer 13 (second crystallizer); a fourth solid-liquid separating step by the solid-liquid separator 14 (fourth solid-liquid separator); a filtrate feeding step by the filtrate feeding passage 17; and a cooling step by the heat exchanger 16 (cooler).

By including the filtrate feeding passage 17 provided with the heat exchanger 16, which is positioned at a non-end portion of the filtrate feeding passage 17, as in the present embodiment, the recovery rate of lithium can be further improved. However, the heat exchanger 16 and the filtrate feeding passage 17 can be eliminated. As previously mentioned, the filtrate feeding passage 17 may be provided with a remover for performing a removing step, the remover being positioned at a non-end portion of the filtrate feeding passage 17, such as the remover 6 of FIG. 1.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

INDUSTRIAL APPLICABILITY

The present invention is useful as a system for and a method of processing a waste lithium-ion battery, the system and the method making it possible to improve the recovery rate of lithium.

The invention claimed is:

1. A system for processing a waste lithium-ion battery, the system comprising:
    a first aqueous solution generator that includes a first elution tank storing water, and that immerses an active material taken out from the waste lithium-ion battery in the water in the first elution tank and subjects the active material to carbon dioxide bubbling in the first elution tank to generate an aqueous solution of pH 5.5 to 8.5, in which lithium contained in the active material is eluted;
    a first solid-liquid separator that removes a solid component from the aqueous solution generated by the first aqueous solution generator;
    a first crystallizer that causes lithium carbonate to be deposited from the aqueous solution, from which the solid component has been removed by the first solid-liquid separator;
    a second solid-liquid separator that performs solid-liquid separation on slurry containing the lithium carbonate deposited in the first crystallizer to take out the lithium carbonate;
    a second aqueous solution generator that generates an aqueous solution of lithium carbonate by introducing the lithium carbonate taken out by the second solid-liquid separator into a second elution tank;
    a third solid-liquid separator that removes a solid component from the aqueous solution generated by the second aqueous solution generator;
    a second crystallizer that causes lithium carbonate to be deposited from the aqueous solution, from which the solid component has been removed by the third solid-liquid separator; and
    a fourth solid-liquid separator that performs solid-liquid separation on slurry containing the lithium carbonate deposited in the second crystallizer to take out the lithium carbonate, wherein
    the second aqueous solution generator generates the aqueous solution of lithium carbonate without performing carbon dioxide bubbling.

2. The system according to claim 1, wherein
the first solid-liquid separator includes:
an upper layer solid-liquid separator that takes out an upper layer portion of the aqueous solution from the first elution tank to remove a floating solid component from the aqueous solution; and
a lower layer solid-liquid separator that takes out a lower layer portion of the aqueous solution from the first elution tank to remove a settling solid component from the aqueous solution.

3. A method of processing a waste lithium-ion battery, the method comprising:
    a first aqueous solution generating step of immersing an active material taken out from the waste lithium-ion battery in water stored in a first elution tank and subjecting the active material to carbon dioxide bubbling in the first elution tank to generate an aqueous solution of pH 5.5 to 8.5, in which lithium contained in the active material is eluted;
    a first solid-liquid separating step of removing a solid component from the aqueous solution generated in the first aqueous solution generating step;
    a first crystallizing step of causing lithium carbonate to be deposited from the aqueous solution, from which the solid component has been removed in the first solid-liquid separating step;
    a second solid-liquid separating step of performing solid-liquid separation on slurry containing the lithium carbonate deposited in the first crystallizing step to take out the lithium carbonate;
    a second aqueous solution generating step of generating an aqueous solution of lithium carbonate by introducing the lithium carbonate taken out in the second solid-liquid separating step into a second elution tank;
    a third solid-liquid separating step of removing a solid component from the aqueous solution generated in the second aqueous solution generating step;
    a second crystallizing step of causing lithium carbonate to be deposited from the aqueous solution, from which the solid component has been removed in the third solid-liquid separating step; and
    a fourth solid-liquid separating step of performing solid-liquid separation on slurry containing the lithium carbonate deposited in the second crystallizing step to take out the lithium carbonate, wherein
    the second aqueous solution generating step includes generating the aqueous solution of lithium carbonate without performing carbon dioxide bubbling.

4. The method according to claim 3, wherein
the first solid-liquid separating step includes:
an upper layer solid-liquid separating step of taking out an upper layer portion of the aqueous solution from the first elution tank to remove a floating solid component from the aqueous solution; and
a lower layer solid-liquid separating step of taking out a lower layer portion of the aqueous solution from the first elution tank to remove a settling solid component from the aqueous solution.

* * * * *